US009142080B2

(12) United States Patent
Templer et al.

(10) Patent No.: US 9,142,080 B2
(45) Date of Patent: Sep. 22, 2015

(54) DISPENSING CONSUMER PRODUCTS

(75) Inventors: John Wesley Templer, Palmer, TX (US); Mark Allsup, Fort Worth, TX (US)

(73) Assignee: Sell Trax Investments, LLC, Palmer, TX (US)

(*) Notice: Subject to any disclaimer, the term of this patent is extended or adjusted under 35 U.S.C. 154(b) by 584 days.

(21) Appl. No.: 12/019,515

(22) Filed: Jan. 24, 2008

(65) Prior Publication Data

US 2009/0192837 A1 Jul. 30, 2009

(51) Int. Cl.

| | |
|---|---|
| ***A47F 1/04*** | (2006.01) |
| ***G05B 13/02*** | (2006.01) |
| ***G06Q 10/00*** | (2012.01) |
| ***G07F 11/04*** | (2006.01) |
| ***G07F 11/00*** | (2006.01) |
| ***G07G 1/00*** | (2006.01) |

(52) U.S. Cl.
CPC .............. *G07F 11/04* (2013.01); *G07F 11/002* (2013.01); *G07G 1/0036* (2013.01)

(58) Field of Classification Search
CPC ................................ G07F 11/002; G07F 11/04
USPC ................... 221/129, 131; 700/232, 236–237
See application file for complete search history.

(56) References Cited

U.S. PATENT DOCUMENTS 3,601,237 A * 8/1971 Ovsienko ...................... 194/239
3,870,135 A * 3/1975 Allen ............................ 194/205
4,482,078 A * 11/1984 Reiss ..................... 221/150 HC
4,961,507 A * 10/1990 Higgins ........................ 221/129
5,205,436 A * 4/1993 Savage .............................. 221/7
5,207,784 A 5/1993 Schwartzendruber
5,243,174 A * 9/1993 Veeneman et al. ............ 235/381
5,467,892 A * 11/1995 Schlamp ........................... 221/7
5,805,456 A 9/1998 Higham
5,847,389 A 12/1998 Mertins
5,959,869 A 9/1999 Miller et al.
5,971,205 A 10/1999 Michaels et al.
6,206,234 B1 3/2001 Rawlins
6,213,341 B1 4/2001 Keith
6,259,965 B1 7/2001 Steele
6,269,285 B1 7/2001 Mignault
6,324,520 B1 11/2001 Walker et al.

(Continued)

OTHER PUBLICATIONS

USPTO Non-Final Office Action in U.S. Appl. No. 12/335,873 dated Apr. 6, 2011, 5 pages.

(Continued)

*Primary Examiner* — Michael K Collins
(74) *Attorney, Agent, or Firm* — Fish & Richardson P.C.

(57) ABSTRACT

A system for dispensing consumer products includes a product bin unit; a product ejector; a product trigger; and a controller. The product bin unit includes a product bin; an ejector aperture; and a trigger aperture. The product ejector is coupled to the product bin unit through the ejector aperture and adapted to drive the product package from the product bin upon receipt of a dispensing signal. The product trigger is coupled to the product bin unit through the trigger aperture. The controller is in communication with the product ejector and the product trigger and includes at least one memory and a processor. The memory stores a dispensing module. The processor is adapted to execute the dispensing module, and the dispensing module is operable when executed to receive a dispensing instruction and transmit the dispensing signal to the product ejector based, at least in part, on the dispensing instruction.

26 Claims, 8 Drawing Sheets

(56) References Cited

U.S. PATENT DOCUMENTS

| | | | | |
|---|---|---|---|---|
| 6,384,402 | B1 * | 5/2002 | Hair et al. | 250/223 R |
| 6,393,339 | B1 * | 5/2002 | Yeadon | 700/237 |
| 6,424,884 | B1 | 7/2002 | Brooke | |
| 6,539,282 | B2 | 3/2003 | Metcalf et al. | |
| 6,604,652 | B1 | 8/2003 | Trautwein | |
| 6,684,126 | B2 | 1/2004 | Omura et al. | |
| 6,708,079 | B2 | 3/2004 | Mason | |
| 6,711,465 | B2 | 3/2004 | Tomassi | |
| 6,792,334 | B2 | 9/2004 | Metcalf et al. | |
| 6,808,082 | B2 | 10/2004 | Ohkubo | |
| 6,871,756 | B1 * | 3/2005 | Gallo | 221/75 |
| 6,896,145 | B2 | 5/2005 | Higgins et al. | |
| 7,086,560 | B2 | 8/2006 | Shioya | |
| 7,530,113 | B2 * | 5/2009 | Braun | 726/28 |
| 8,019,471 | B2 * | 9/2011 | Bogash et al. | 700/242 |
| 8,086,349 | B2 * | 12/2011 | Blust et al. | 700/232 |
| 8,401,697 | B2 | 3/2013 | Templer | |
| 2002/0046122 | A1 * | 4/2002 | Barber et al. | 705/17 |
| 2004/0252676 | A1 * | 12/2004 | Bye | 370/352 |
| 2004/0254676 | A1 * | 12/2004 | Blust et al. | 700/231 |
| 2005/0269347 | A1 | 12/2005 | Templer et al. | |
| 2006/0235569 | A1 | 10/2006 | Watts | |
| 2007/0185615 | A1 * | 8/2007 | Bossi et al. | 700/244 |
| 2013/0297067 | A1 | 11/2013 | Templer | |

OTHER PUBLICATIONS

USPTO Final Office Action in U.S. Appl. No. 12/335,873 dated Oct. 28, 2011, 6 pages.

USPTO Non-Final Office Action in U.S. Appl. No. 12/335,873 dated Mar. 9, 2012, 6 pages.

USPTO Quayle Action in U.S. Appl. No. 12/335,873 dated Sep. 21, 2012, 5 pages.

* cited by examiner

DISPENSING CONSUMER PRODUCTS

TECHNICAL BACKGROUND

This disclosure relates to dispensing consumer products, and more particularly, to dispensing tobacco products from a system for securing tobacco products against theft.

BACKGROUND

Consumer products, and in particular tobacco products, are sold to the public in a variety of different locations. Such locations may include grocery stores, convenience stores, restaurants, and bars, to name but a few. Generally, an employee of such locations may be responsible for the management and sale of the tobacco products at any given time period. Management of the tobacco products may include, for example, storing the tobacco products in a safe and secure location, performing inspection and inventory on the tobacco products at predetermined intervals, transporting the tobacco products from the secure location to a display stand or cabinet, and completing a sale transaction of the tobacco products to consumers. In some instances, one or more packages of tobacco products may be misplaced, stolen, or otherwise lost, possibly resulting in loss of revenue or profits from the location. Moreover, such loss of revenue or profits may not be transferred to another business, such as a manufacturer of the tobacco products. Theft of tobacco products, and indeed any consumer product, may be a concern for sellers and resellers of such products.

Further, the management of the tobacco products, particularly the inventory procedure, may be time consuming and tedious. Such a procedure, in some cases, may be performed manually by the employee of the location at which the inventory is maintained. Thus, there may be some degree of error associated with the procedure, such as a miscount of revenue or quantity. Errors such as these can lead to mistakes in ordering future product, possibly resulting in an overstock of the product or an out-of-stock condition. Therefore, many sellers of tobacco products may spend a substantial amount of revenue ensuring that such errors do not occur.

SUMMARY

In one general implementation, a system for dispensing consumer products includes a product bin unit; a product ejector; a product trigger; and a controller. The product bin unit includes a product bin adapted to hold at least one product package; an ejector aperture; and a trigger aperture. The product ejector is coupled to the product bin unit through the ejector aperture and adapted to drive the product package from the product bin upon receipt of a dispensing signal. The product trigger is coupled to the product bin unit through the trigger aperture. The controller is communicably coupled to the product ejector and the product trigger and includes at least one memory and one or more processors. The memory stores a dispensing module. The one or more processors are adapted to execute the dispensing module, and the dispensing module is operable when executed to receive a dispensing instruction and transmit the dispensing signal to the product ejector based, at least in part, on the dispensing instruction.

In more specific aspects, the product bin unit may further include a substantially vertical back plate including the ejector aperture; a substantially horizontal bottom plate coupled to the back plate and including the trigger aperture; a first vertical side plate and a second vertical side plate coupled to at least one of the back plate and the bottom plate; and a first substantially vertical divider plate. The first divider plate may be coupled to at least one of the back plate and the bottom plate and may be arranged between the first and second side plates. At least a portion of the back plate, the bottom plate, the divider plate, and one of the first or second side plates may define the product bin. The product bin may be adapted to receive the product package from a front of the product bin.

In certain aspects of the system, the product package may be a tobacco product, a medicinal product, or a shaving product (e.g., a package of razor blades). The tobacco product may include, for example, a cigarette package or a smokeless tobacco package, and the medicinal product may include, for example, a pain reliever package or a cough syrup package. Additionally, the product ejector may be an electrically actuated piston-cylinder that may include an electromagnet adapted to drive at least a portion of the piston from the cylinder upon energizing and a spring adapted to drive the portion of the piston into the cylinder upon de-energizing of the electromagnet. Further, the product trigger may include a sensor adapted to transmit a confirmation signal to the controller upon actuation of the piston-cylinder.

In some particular aspects, multiple product bin units may be provided and the system may further include a cabinet adapted to enclose at least a portion of the product bin units and the controller. The cabinet may include a supply compartment including a door pivotally coupled to the cabinet and a return compartment including a return opening. The product bin units may include a first product bin that is open in a first direction and a second product bin that is open in a second direction. The second direction may be approximately 180 degrees from the first direction. Also, the first product bin may be adapted to hold a first size product package, and the second product pin may be adapted to hold a second, smaller size product package. The return compartment may include a lockable door pivotally coupled to the return compartment. Additionally, the cabinet may be substantially opaque.

In certain implementations, the system may further include an electronic data reader coupled to the controller and adapted to transmit the dispensing instruction to the controller at least partially based on data stored on a product purchase ticket. The electronic data reader may include a magnetic ink character recognition (MICR) reader. The product purchase ticket may include a MICR code that includes at least one of a representation of a product package quantity and a representation of a product package type.

In particular aspects, the dispensing module may be further operable to present a graphical user interface (GUI) to a user. The dispensing module may receive the dispensing instruction from the user through the GUI, and the dispensing instruction may include a product type and a product quantity. The dispensing module may compare the product type to a product library stored in the memory; compare the product quantity to a product inventory of the product type stored in the memory; determine a product selection based on the product type and the product quantity; generate the dispensing signal based on the product selection; and transmit the dispensing signal to the product ejector. Further, the dispensing module may be operable to receive a request from the user for at least one sales data point, where the request includes a time period. The sales data point may include one of the following: a value of sales in the time period based on the product type; a value of sales in the time period based on the product bin, where the product bin may include at least one product package of the same product type; and a value of sales in the time period based on a time shift period, where the time shift period may be at least a portion of a 24 hour period. The dispensing module may further be operable to generate a report including the sales data point and to save the report for subsequent presentation to the user through the GUI.

In some aspects, the dispensing module may further be operable to present an authorization code request to the user; receive an authorization code from the user; confirm the authorization code as a valid code; present a sales data request to the user; and receive the sales data request from the user. The request may include the time period and one of the following: the product type; the product bin; or the time shift period. Also, the dispensing module may further be operable to receive an update to the product library stored in the memory; receive a remote request from a remote user for the sales data point; and transmit the sales data point to the remote user. The dispensing module may further be operable to receive a second quantity of product packages of the product type input from the user; calculate a new product inventory of the product type (where the new product inventory is equal to a sum of the product inventory and the second quantity); and present the new product inventory of the product type to the user.

In another general aspect, a method for dispensing consumer product includes: presenting a graphical interface to a user; receiving a product type and a product quantity from the user through the graphical interface; comparing the product type to a product library stored in a memory; comparing the product quantity to a product inventory of the product type stored in the memory; determining a product selection based on the product type and the product quantity; generating a dispensing signal based on the product selection; transmitting the dispensing signal to a product ejector; and driving a first quantity of a product package from a product bin by the product ejector, where the first quantity is equal to the product quantity.

The method may further include receiving a request from the user for at least one sales data point, where the request includes a time period; generating a report comprising the sales data point; and graphically presenting the report to the user. The sales data point may be, for example, one of the following: a value of sales in the time period based on the product type; a value of sales in the time period based on a product bin, where the product bin may include at least one product package of the same product type; and a value of sales in the time period based on a time shift period, where the time shift period includes at least a portion of a 24 hour period.

In some aspects, receiving a request from the user for at least one sales data point may include presenting an authorization code request to the user; receiving the authorization code from the user; confirming the authorization code as a valid code; presenting a sales data request to the user; and receiving the sales data request from the user. The request may include the time period and one of the product type; the product bin; or the time shift period. The method may also include the steps of receiving an update to the product library stored in the memory; receiving a remote request from a remote user for the sales data point; and transmitting the sales data point to the remote user.

In certain aspects, the method may include the steps of receiving a second quantity of product packages of the product type; calculating a new product inventory of the product type, where the new product inventory is approximately equal to a sum of the product inventory and the second quantity; and decreasing the new product inventory by the product quantity upon driving the first quantity of the product package from the product bin by the product ejector. Further, receiving a product type and a product quantity from the user through the graphical interface may include receiving a product type and a product quantity from the user via a MICR code on a product purchase ticket.

One or more implementations of a system or method for dispensing consumer product described in the present disclosure may include one, some, or all of the following features. For example, a system or method for dispensing consumer product may provide for a more secure location for one or more consumer products, such as tobacco products or medicinal products. As another example, a system or method for dispensing consumer product may help reduce revenue losses of tobacco or medicinal products due to theft. As a further example, a system or method for dispensing consumer product may at least partially increase revenue of a business enterprise by decreasing labor costs. As yet another example, a system or method for dispensing consumer product may allow for expedited and accurate tracking of tobacco or medicinal product sales. Also, a system or method for dispensing consumer product may allow sales of tobacco or medicinal product to be monitored at a location remote from the sale location. Further, a system or method for dispensing consumer product may at least partially assist a business enterprise in maintaining an appropriate inventory size of tobacco and medicinal product. A system or method for dispensing consumer product, additionally, may provide a nondescript container for tobacco and medicinal products. As another example, a system or method for dispensing consumer product may allow for easier sales data and inventory data tracking of tobacco or medicinal products by a business enterprise.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
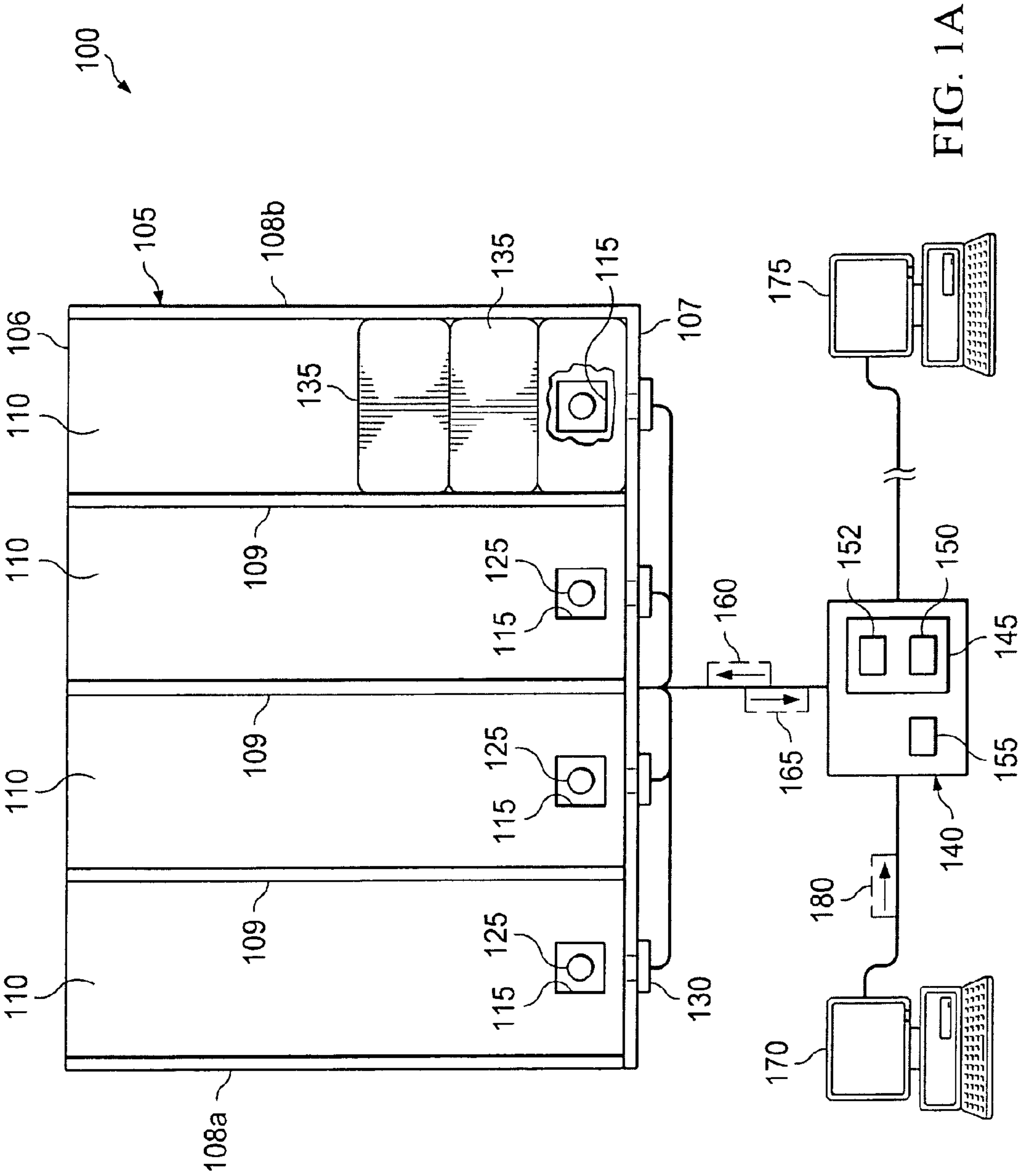
FIGS. 1A-C illustrate a system for dispensing consumer products.
Figure 1B:
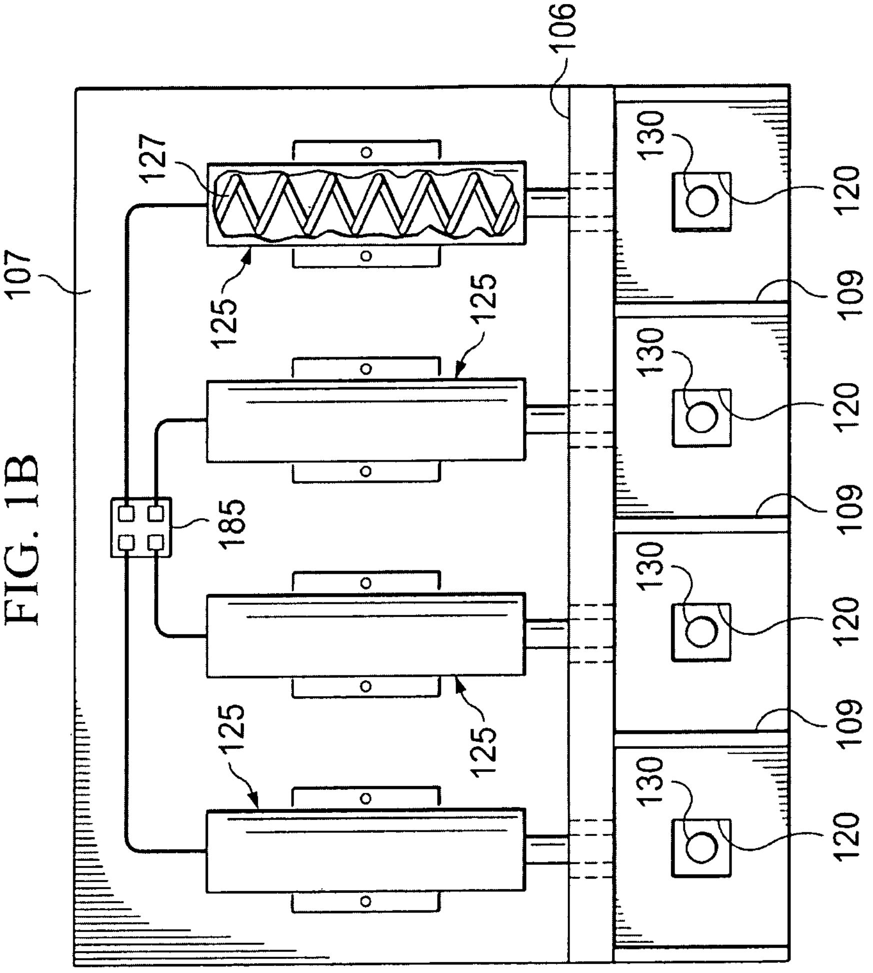
Figure 1C:
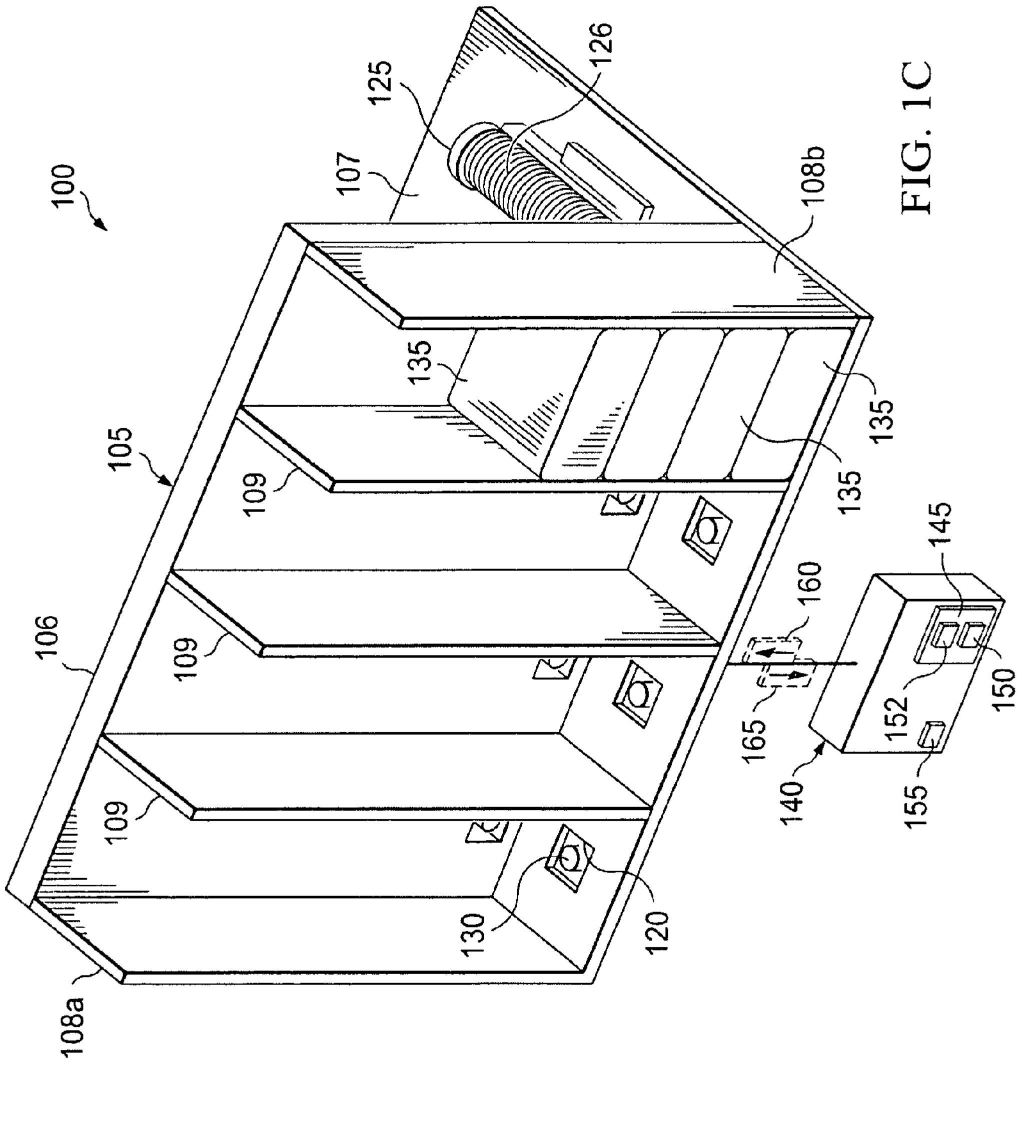

FIGS. 1A-C illustrate one implementation of a system 100 for dispensing consumer products. System 100, for example, may be utilized to dispense tobacco products, medicinal products, or any other consumer product, as appropriate, in a variety of locations. For instance, system 100 may be utilized in a grocery store, a convenience store, a restaurant, or a bar. In some aspects, the system 100 may be mounted behind a sales counter in a convenience store, thereby allowing access to the system 100 by one or more sales associates or sales administrators. Generally, system 100 encloses one or more consumer products and dispenses such consumer products upon receipt of an appropriate electronic instruction.

System 100 includes a product bin unit 105, a controller 140, a point-of-sale (POS) terminal 170, and a remote terminal 175. The product bin unit 105, typically, may be a structure formed of molded plastic, aluminum, or galvanized steel, which includes a back plate 106, a bottom plate 107, one or more side plates 108*a* and 108*b*, and one or more divider plates 109. As illustrated, the back plate 106 is substantially vertical and planar, and is coupled at its base to the bottom plate 107. The bottom plate 107 is substantially horizontal and planar and supports the back plate 106, side plates 108*a* and 108*b*, and divider plates 109. Each side plate 108*a* and 108*b* and divider plate 109 may be coupled to the bottom plate 107 and back plate 106.

A configuration of the product bin unit 105, including the back plate 106, bottom plate 107, side plates 108*a* and 108*b*, and divider plates 109, may form one or more product bins 110. Each product bin 110, in some aspects, may be an elongated enclosure with a substantially rectangular transverse cross-section with two open sides, such as is shown in FIGS. 1A-C. One or more product packages 135 may thus be loaded into each product bin 110 from a front side or top side of the bin 110.

One or more components of the product bin unit 105, namely, the back plate 106, bottom plate 107, side plates 108*a* and 108*b*, and divider plates 109 may be formed as an integral piece of molded plastic. But the foregoing components may be separately manufactured and fastened together to form the product bin unit 105 through, for example, mechanical fasteners such as drive screws or bolts, or adhesives.

The back plate 106 includes one or more ejector apertures 115. Each ejector aperture 115 is located proximate to the bottom plate 107, such that, for instance, the aperture 115 is aligned with the product package 135 in contact with the bottom plate 107. The ejector aperture 115 allows at least a portion of a product ejector 125 to extend through the back plate 106 proximate to the product package 135 on the bottom plate 107. The bottom plate 107 may include one or more trigger apertures 120, located immediately beneath the product package 135 supported by the bottom plate 107. A trigger aperture 120 allows at least a portion of a product trigger 130 to extend through the bottom plate 107.

One or more product ejectors 125 are attached to the bottom plate 107. Generally, there may be a corresponding product ejector 125 for each product bin 110. The product ejectors 125 may be electrically-actuated to extend a portion of the product ejector 125 through the ejector aperture 115 to contact the product package 135 in contact with the bottom plate 107, thus driving the product package 135 from the product bin 110. In some aspects, the product ejector 125 may be an electrically-actuated piston-cylinder device, including an electromagnet 126. Upon energizing of the electromagnet 126, a piston-portion, at least some of which may be metallic, may be driven through and extend from the cylinder and through the ejector aperture 115. When the piston contacts the product package 135, the package 135 may be driven from the product bin 110, thereby dispensing the product package 135 from the system 100. Upon de-energizing of the electromagnet 126, a spring 127 within the cylinder-portion may force the piston back into the cylinder to await another actuation signal (e.g., dispensing signal 160).

Each product ejector 125 is in communication with the controller 140 through one or more electrical connections coupled to a connection port 185. Therefore, upon receipt of a dispensing signal 160, the product ejector 125 may be actuated to dispense the product package 135. The product trigger 130 is also in communication with the controller 140. Once the product package 135 is dispensed from the system 100, the product trigger 130 may transmit a confirmation signal 165 to the controller 140 confirming that the product package 135 has been driven from the product bin 110. For instance, in some aspects, the product trigger 130 may include an electronic sensor that determines when the product package 135 is dispensed. In some implementations, the product trigger 130 may work in collaboration with the product ejector 125, such that actuation of the product ejector 125 may actuate the product trigger 130 as well.

The controller 140 is a processing device that can receive and transmit electrical or electronic signals for dispensing consumer products and is in communication with one or more product ejectors 125 and one or more product triggers 130. Controller 140 includes a memory 145 and a processor 155. Although illustrated as a single memory, memory 145 may include multiple memory modules. Further, memory 145 may include any memory or database module and may take the form of volatile or non-volatile memory including, without limitation, magnetic media, optical media, random access memory (RAM), read-only memory (ROM), removable media, or any other suitable local or remote memory component. Illustrated memory 145 includes or points to a dispensing module 150 and a product library 152. But memory 145 may also include any other appropriate data such as VPN applications or services, firewall policies, a security or access log, print or other reporting files, HTML files or templates, data classes or object interfaces, child software applications or sub-systems, and others.

The processor 155 executes instructions and manipulates data to perform the operations of the controller 140. Processor 155 is, for example, a central processing unit (CPU), a blade, an application specific integrated circuit (ASIC), or a field-programmable gate array (FPGA). Although FIGS. 1A-C illustrate a single processor 155 in the controller 140, multiple processors 155 may be used according to particular needs and reference to processor 155 is meant to include multiple processors 155 where applicable. In the illustrated embodiment, processor 155 executes the dispensing module 150, as well as any other modules, sub-modules, or applications stored on or accessed by the controller 140.

Dispensing module 150, at a high level, provides a structured environment (e.g., a software application) from which one or more consumer product dispensing processes, modules, or applications may be operated by, for instance, the controller 140, the POS terminal 170, or the remote terminal 175. In other words, dispensing module 150 provides an environment in which the controller 140, the POS terminal 170, or the remote terminal 175 may manipulate, manage, or view product dispensing information. Regardless of the particular implementation, "software" may include software, firmware, wired or programmed hardware, or any combination thereof as appropriate. Indeed, dispensing module 150 may be written or described in any appropriate computer language including C, C++, Java, Visual Basic, assembler, Perl, any suitable version of 4GL, as well as others. For example, dispensing module 150 may be a composite application, portions of which may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's NET. It will be understood that dispensing module 150 may include numerous other sub-modules or may instead be a single multi-tasked module that implements the various features and functionality through various objects, methods, or other processes. Further, while illustrated as internal to the controller 140, one or more processes associated with dispensing module 150 may be stored, referenced, or executed remotely. For example, a portion of dispensing module 150 may be a web service that is remotely called, by, for instance, remote terminal 175, while another portion of dispensing module 150 may be an interface object bundled for processing at the controller 140. Moreover, dispensing module 150 may be a child or sub-module of another software module or enterprise application (not illustrated) without departing from the scope of this disclosure.

Generally, the dispensing module 150 provides a software interface for a user of the system 100 in order to, for example, dispense one or more product packages 135, keep track of inventory of the product packages 135 stored in the system 100, and calculate or store one or more sales metrics, which may be used to predict future requirements or needs of the system 100. For instance, in some aspects, the dispensing module 150 may provide a graphical interface for display on POS terminal 170, remote terminal 175, or a display (not shown) integral to the system 100 itself. The graphical interface may allow for the user to choose a particular type of product package 135 (e.g., a brand of cigarette or particular type of cigarette among several), as well as a quantity of product packages 135 to be dispensed. Once this information is received from the user by the dispensing module 150, it may determine the appropriate dispensing signal 160 to transmit to one or more product ejectors 125. In some aspects, this information is included in a dispensing instruction 180 transmitted from the POS terminal 170 to the controller 140.

Further, the dispensing module 150 may ensure that product packages 135 of identical type, which reside in distinct product bins 110, are dispensed evenly, thereby ensuring that quantities of the product packages 135 in the product bins 110 decrease evenly. As one example, adjacent product bins 110 may each contain a particular type of cigarette packages. if the user enters a quantity of two for the particular type of cigarette, then one cigarette package from each product bin 110 is dispensed according to an appropriate dispensing signal 160 generated by the dispensing module 150.

The dispensing module 150 may also, typically, generate and store inventory data for one or more product packages 135 contained in the product bins 110. For example, a total quantity of product packages 135 contained in each product bin 110 may be input into the dispensing module 150 by the user at, for example, the POS terminal 170, remote terminal 175, or other stand alone computing device as appropriate. As product packages 135 are dispensed (e.g., sold) from the system 100, the dispensing module 150 adjusts various data to account for such sales. For instance, the dispensing module 150 may keep track of data including: total sales of product packages 135 over a particular time frame (e.g., hour, day, week, month, work shift); total sales of product packages 135 of a particular type or brand; total sales of product packages 135 from a particular bin 110; total value of product packages 135 presently in the system 100; total value of product packages 135 of a particular type or brand presently in the system 100; and total value of product packages 135 presently within a particular bin 110. As further examples, the dispensing module 150 may also account for data such as: a time and date when one or more product packages 135 were added to the system 100 and an employee or user which added product packages 135 to the system 100. The dispensing module 150 may also generate one or more reports including information and data to be displayed on, for example, the POS terminal 170, remote terminal 175, or other appropriate device, such as a mobile computing device or a personal digital assistant (PDA).

Memory 145 may also store or point to the product library 152. The product library 152 typically includes data describing various parameters of the product packages 135 stored in the system 100. Product library 152 may be in any appropriate format, such as, for example, in a relational format, thus allowing the memory 145 to provide access to such data using a structured query language (SQL), which may include any of the plurality of versions of the SQL relational database query and manipulation language such as, for example, SEQUEL, ANSI SQL, any other proprietary or public variant of SQL, or other suitable or generic query language (such as eXtensible Markup Language (XML)). Memory 145 may include all of the product library 152, but product library 152 may be stored on one or more remote servers, memories, or data repositories, including, for example, POS terminal 170 and remote terminal 175.

The product library 152 may store various data associated with the product packages 135, including: a sale price, a brand name, a type, and an SKU of an individual product package 135. Further, the product library 152 may store a graphical representation (e.g., a .JPEG, .JPG, .TIF, .TIFF, or .BMP file) of each particular brand or type of product packages 135 contained in the system 100. Thus, the graphical representations of each particular type of product package 135 may be displayed to the user of the system 100 via the POS terminal 170, remote terminal 175, or integral display (not shown) of the system 100. In some aspects, the product library 152 may be updated to include data associated with new or additional product packages 135. For instance, a new brand or type of product package 135 (e.g., cigarette package) may be inserted into a product bin 110 for sale. The sales price, SKU, brand name, or other information may be added to the product library 152 for the new brand or type via the POS terminal 170 or remote terminal 175.

POS terminal 170 is communicably coupled to the controller 140 and, generally, may be any computing device that monitors or manages the controller 140 and the dispensing of product packages 135 from the system 100. Generally, POS terminal 170 includes memory, as well as one or more processors, and comprises an electronic computing device operable to receive, transmit, process, store, or manage data associated with the system 100. POS terminal 170 may also be communicably connected to the remote terminal 175 and a variety of other networks or services, such as, for example, a payment verification service provided by a credit or debit card company or financial institution. In some aspects, POS terminal 170 is located within the premises of a retail environment such as a retail convenience store, grocery store, or “big box” retailer. Regardless of the location, the POS terminal 170 typically provides a display through which the dispensing module 150 may present a graphical user interface (GUI) to a user of the system 100 in order to facilitate the dispensing of one or more product packages 135. Further, the POS terminal 170 may provide a display and, in some aspects, an associated printing device, capable of displaying or printing one or more reports (e.g., sales data or inventory reports) generated by the dispensing module 150. The POS terminal 170 may also provide an appropriate input device, such as, for example, a keyboard, keypad, mouse, or light pen, to facilitate the entry of dispensing information (e.g., a brand or type and a quantity of a product package 135) into the POS terminal 170. The dispensing information may thus be transmitted to the controller 140 via dispensing instruction 180. In some aspects, the POS terminal 170 may include a touch screen display, which may allow one or more items of dispensing information to be input into the POS terminal 170.

Remote terminal 175 may be, generally, any computing device that remotely monitors or manages the controller 140 and the dispensing of product packages 135 from the system 100. This disclosure provides merely one example of computers that may be used with the disclosure. As used in this document, the term "computer" is intended to encompass any suitable processing device. For example, in some aspects, the remote terminal 175 may be located at a corporate headquarters of a retail enterprise utilizing the system 100. Thus, sales data generated and/or stored by the dispensing module 150 may be accessed by the remote terminal 175. Further, sales data or inventory reports generated by the dispensing module 150 may be access and/or viewed via the remote terminal 175. Updated or additions to the product library 152 may also be transmitted to the controller 140 from the remote terminal 175.

Figure 2A:
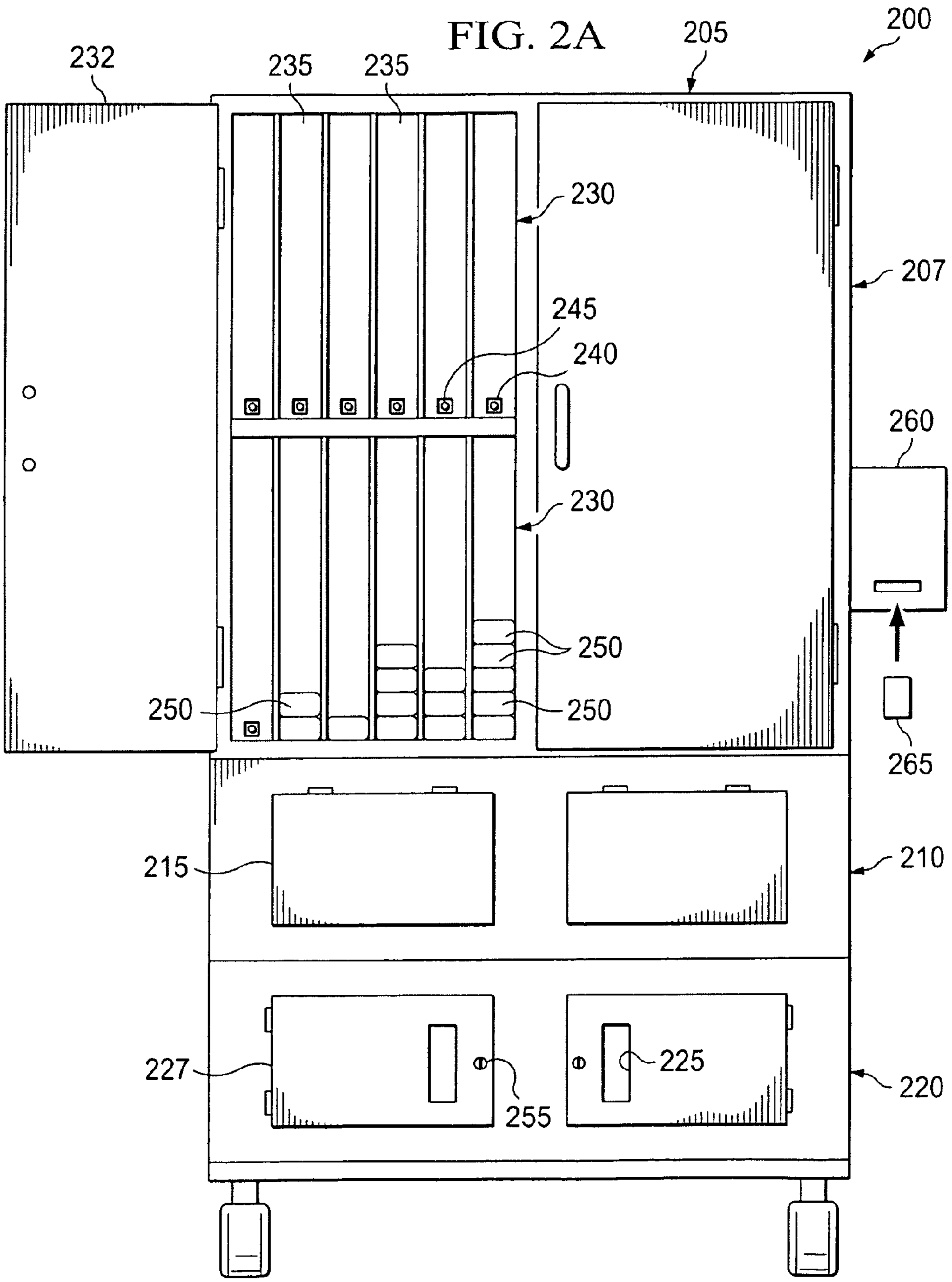
FIGS. 2A-C illustrate an alternative system for dispensing consumer products including a cabinet.
Figure 2B:
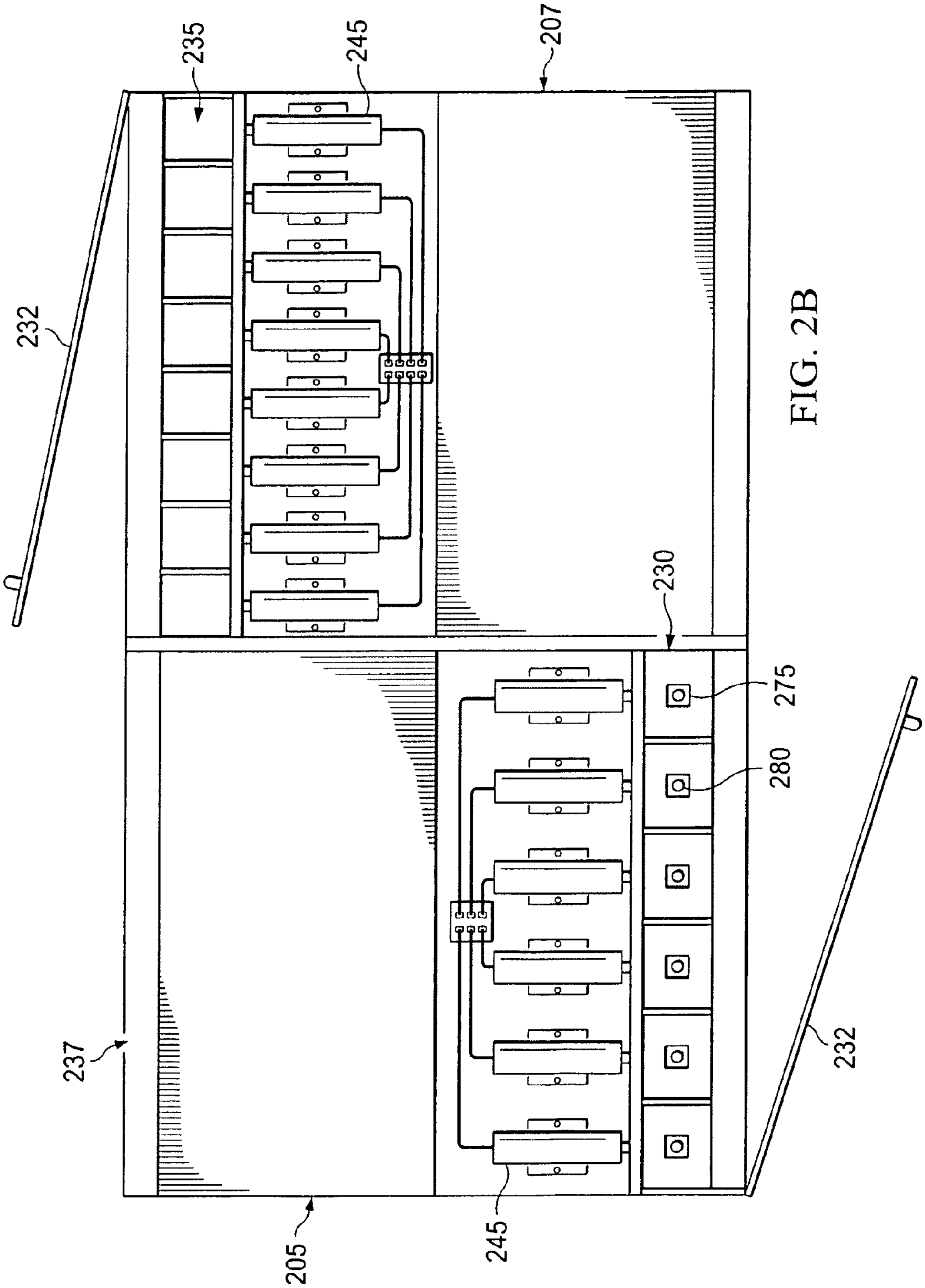
Figure 2C:
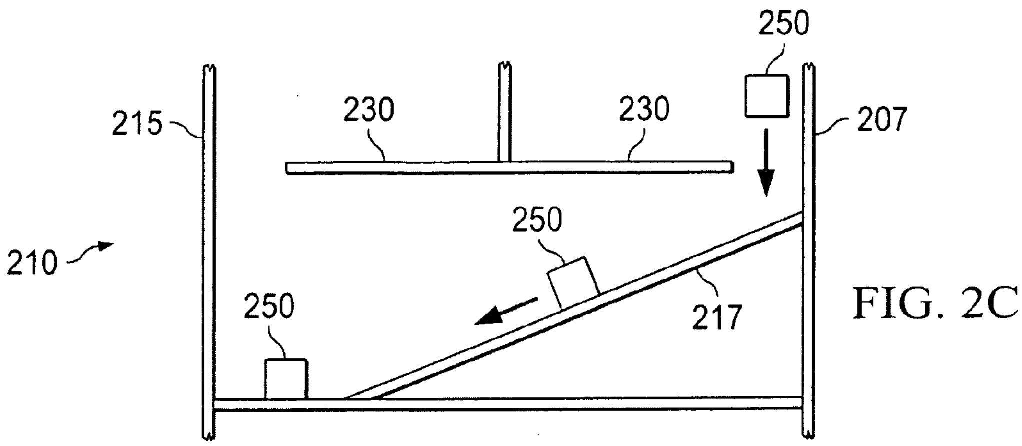

FIGS. 2A-C illustrate another implementation of a system 200 for dispensing consumer products including a cabinet 205. Cabinet 205 includes a supply compartment 210, a return compartment 220, and one or more product bin units 230. In some implementations, the system 200 may include an electronic data reader 260 communicably coupled to the system 200. Further, each product bin unit 230 may include one or more product bins 235; one or more ejector apertures 240; one or more product ejectors 245; one or more trigger apertures 275; one or more product triggers 280; and contain one or more product packages 250. The foregoing components of the product bin unit 230, in some aspects, may be substantially similar to these same components described with reference to FIGS. 1A-C. System 200 may also include a controller (not shown) communicably coupled to the product ejectors 245 and product triggers 280 and enclosed, at least in part, by the cabinet 205. Generally, the system 200 provides a stand-alone product dispensing system that may be located in, for instance, a retail enterprise or food and beverage enterprise, for dispensing one or more product packages 250 (e.g., cigarette packages, smokeless tobacco packages, or medicinal packages).

Cabinet 205 may be a modular or unitized cabinet constructed of, for example, molded plastic, aluminum with a powder-coat finish, or stainless steel, to name but a few. With reference to FIG. 2A in particular, the cabinet 205 contains three modules including a product compartment 207, the supply compartment 210, and the return compartment 220. In general, the product compartment 207 encloses at least a portion of one or more product bin units 230 and includes one or more doors 232 pivotally coupled to the compartment 207. In some aspects, as shown in FIG. 2B, the product compartment 207 may includes doors 232 on opposed sides of the cabinet 205. Thus, product bin units 230 may be enclosed back-to-back in the product compartment 207, allowing product packages 250 to be dispensed to either side of the cabinet 205. This may allow, in some aspects, a greater total number of product packages 250 to be enclosed within the cabinet 205.

Supply compartment 210, in some implementations, may be located below the product compartment 207 and includes one or more supply doors 215 pivotally coupled to the supply compartment 210. Generally, the supply compartment 210 provides an enclosed space to contain one or more dispensed product packages 250. For example, in some aspects, the product compartment 207 and supply compartment 210 may share a common volume of vertical space 237 between the doors 232 and product bin units 230, which allows a particular product package 250 driven from a product bin 235 to fall within the cabinet 205 from the product compartment 207 to the supply compartment 210.

In some aspects, as shown more particularly in FIG. 2C, the supply compartment 210 may also include a ramp 217 extending from a back side of the cabinet 205 to a front side (e.g., the side including the supply doors 215) and across a width of the cabinet 205. The ramp 217, for example, may allow for product packages 250 dispensed from one or more product bin units 230 facing the back side of the cabinet 205 to slide to the front side of the cabinet. Thus, regardless of which product bin unit 230 a certain product package 250 is dispensed from and, more particularly, regardless of an orientation of the product bin units 230, the user of the system 200 may have a single access location to retrieve the dispensed package 250 from the supply compartment 210.

In some aspects, the supply compartment 210 may also enclose at least a portion of a controller, such as the controller 140 illustrated in FIGS. 1A-C. For example, the controller may be detachably mounted within the supply compartment 210 to a bottom side of the product compartment 207 and be communicably coupled to the product ejectors 245 and the product triggers 280. Further, similar to controller 140, the controller in system 200 may be communicably coupled to, for example, a POS terminal and/or a remote terminal.

The return compartment 220, generally, may be located beneath the supply compartment 210 and may provide a substantially secure and enclosed space in which product packages 250 mistakenly dispensed may be stored. For example, in some aspects, the return compartment 220 may not share the vertical space 237 with the product compartment 207 and supply compartment 210. In such aspects, the return compartment 220 may only be accessible through a return door 227, which includes a lock 255, and is pivotally coupled to the return compartment 220. The return door 227 includes a return slot 225, which allows a product package 250 to be placed into the return compartment 220 without unlocking or opening the return door 227.

For instance, the user of the system 200 (e.g., a sales clerk) may accidentally dispense a certain product package 250 of an incorrect brand or type as requested by a customer. The user may not have access to the product compartment 207 for security reasons, so the mistakenly dispensed product package 250 may be inserted into the return slot 225 for storage. At a future time, for example, at the end of a work shift when a manager is present, any product package 250 in the return compartment 220 may be returned to the appropriate product bin 235 in the product compartment 207.

In some aspects, the system 200 includes the electronic data reader 260, which may be communicably coupled to the controller (not shown) of the system. Generally, the electronic data reader 260 may transmit information, such as a dispensing instruction, to the controller of the system 200 so that one or more product packages 250 may be dispensed. Such information may be based on electronic data, such as a brand or type and quantity of a particular product package 250, stored on a product purchase ticket 265. For instance, in some implementations, a customer may purchase one or more product packages 250 (e.g., cigarette packages) at a location remote from the cabinet 205, such as a check out terminal in a grocery store. Once payment is made by the customer, a sales clerk may provide the customer with a product purchase ticket 265 indicating the particular item purchased, as well as its quantity. The customer may then take the ticket 265 to the system 200 and insert the ticket 265 into the electronic data reader 260. In some aspects, the customer may enter a code printed on the ticket 265 into the electronic data reader 260. The code may specify the brand or type and quantity of a particular product package 250. Once the correct product package or packages 250 are dispensed to the supply compartment 210, the customer may retrieve the purchased product via the supply door 215. In various implementations, the electronic data reader 260 may be a magnetic ink character recognition (MICR) character reader and data is printed on the product purchase ticket 265 with magnetic ink or toner.

Figure 3:
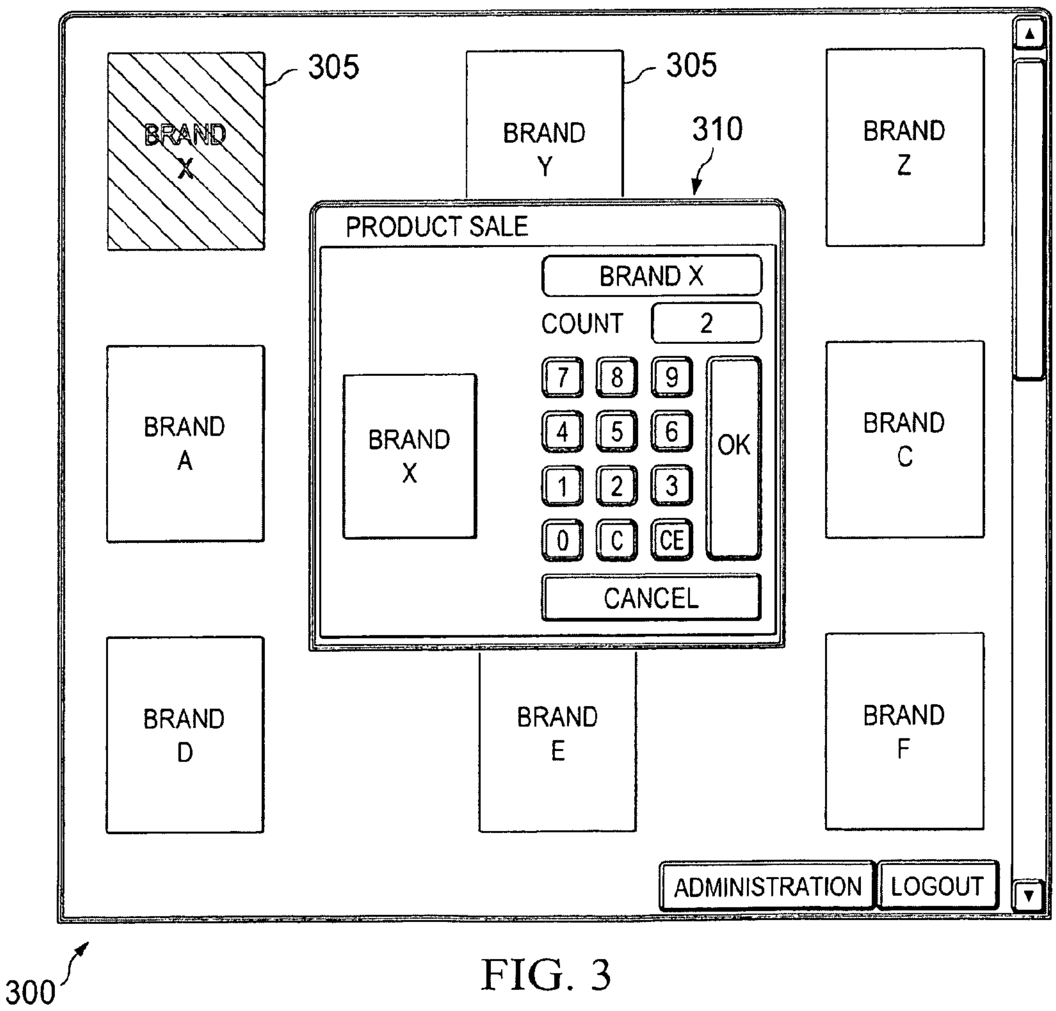
FIG. 3 is an example of a graphical user interface which may be used in a system for dispensing consumer products.

FIG. 3 illustrates one example of a graphical user interface (GUI) 300, which may be generated by a dispensing module in a system for dispensing consumer products. Graphical user interface 300, for example, may be utilized by the dispensing module 150 in system 100 illustrated in FIGS. 1A-C. Further, GUI 300 may be presented to a user on, for example, a POS terminal or a remote terminal, such as the POS terminal 170 or remote terminal 175, as well as a display monitor integral to the system. As shown in FIG. 3, GUI 300 may present a graphical list of product packages 305, such as graphical representations of cigarette packages. Once a particular brand is chosen, for example Brand "X" as shown in FIG. 3, an additional selection window 310 is presented to the user by the dispensing module. Also, the selected product package 305, in some implementations, may be grayed out once selected. As illustrated, the selection window 310 may display a graphical representation of the selected product package 305, as well as a quantity selection box in which a particular numeric value may be entered. The selection window 310, in some aspects, may provide the user with the unit price of the selected product package 305 and a total sale price of one or more selected product packages 305.

Figure 4A:
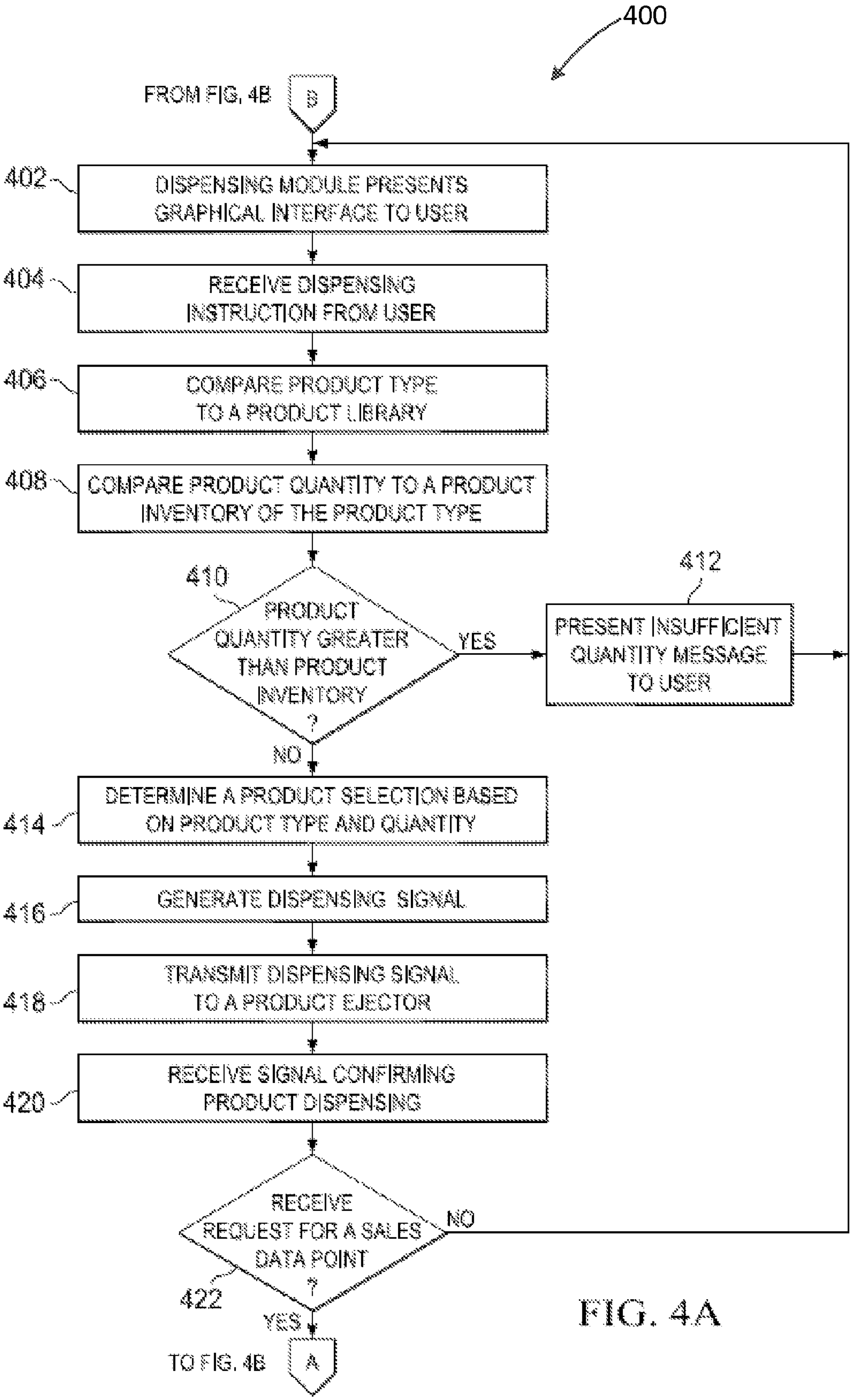
FIG. 4 is a flowchart illustrating an example of a method for dispensing consumer products.
Figure 4B:
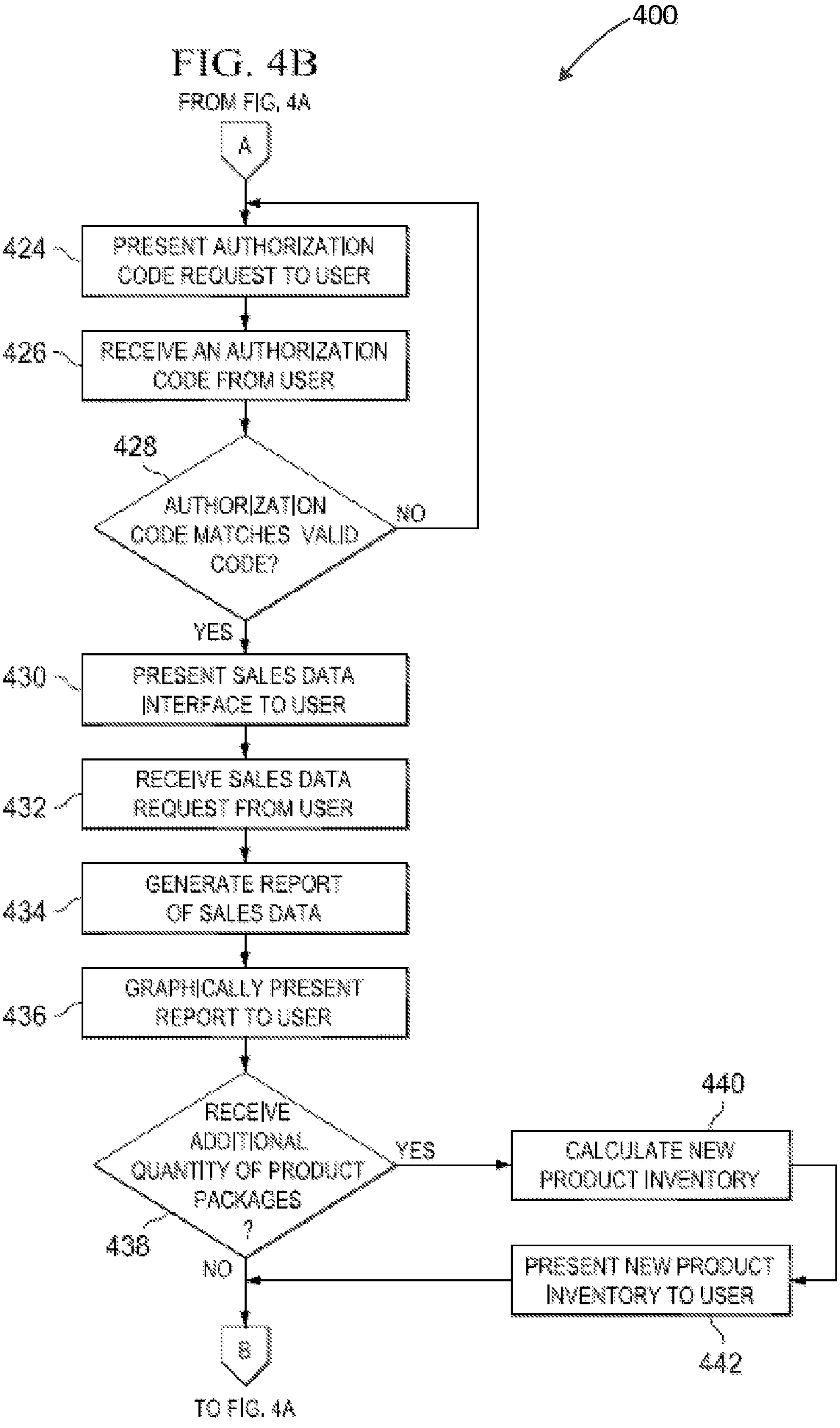

FIG. 4 is a flowchart illustrating an example method 400 for dispensing consumer products. Method 400 may be implemented by a system for dispensing consumer products, such as for example, system 100 including a product bin unit including one or more product bins, product ejectors, and product triggers; a controller including a dispensing module; a POS terminal; and a remote terminal. Further, method 400 may be implemented by system 200 illustrated in FIGS. 2A-C. For instance, the dispensing module presents a graphical user interface (GUI) to a user [402]. In some aspects, the GUI may be displayed to the user at the POS terminal, as well as the remote terminal. The dispensing module receives a dispensing instruction from the user [404]. The dispensing instruction, for example, may consist of a type of a product, such as a package of cigarettes, to be purchased, as well as a quantity of the product to be purchased. The dispensing module compares the product type in the dispensing instruction to a corresponding product type in a product library [406]. The product library may be stored in, for example, the controller, the POS terminal, or the remote terminal, and stores such information as product price. The dispensing module then compares the product quantity in the dispensing instruction to a product inventory of the selected product type [408]. The product inventory may also be stored in the controller, the POS terminal, or remote terminal, and may be continually updated (e.g., reduced or increased) as product is added and sold to and from the system. If the product quantity requested in the dispensing instruction is greater than the existing product inventory in the system [410], then the dispensing module may present an insufficient quantity message to the user [412] and present the GUI to the user [402].

If the product quantity requested in the dispensing instruction is less than or equal to the existing product inventory in the system, a product selection based on the product type and product quantity is determined by the dispensing module [414]. The dispensing module then generates a dispensing signal based on the product selection [416], i.e., based on the requested product type and product quantity. The dispensing signal is transmitted from the dispensing module via the controller to one or more product ejectors [418], thus electrically actuating the product ejectors to drive the requested product from the appropriate product bins. The dispensing module then receives a confirmation signal from each product trigger coupled to the product bins from which the requested product was dispensed [420]. The confirmation signal or signals, for example, may indicate to the dispensing module that a particular inventory value of product packages (e.g., cigarette packages) within a product bin should be decreased by the product quantity dispensed from the product bin.

According to method 400, the dispensing module may also receive a request for a sales data point from the user [422]. If no request is received, the dispensing module presents the GUI to the user [402]. If a request for a sales data point is received, however, the dispensing module presents an authorization code request to the user [424]. For example, an administrator of the system may require password access to protect any financial or proprietary information stored and/or managed by the dispensing module. The dispensing module receives an authorization code from the user [426] and compares the received code to a valid code. The valid code may be a preset alphanumeric code input into the dispensing module by, for example, the administrator of the system. If the received authorization code does not match at least one valid code [428], the dispensing module may present another authorization code request to the user [424]. In some aspects, the administrator may limit the number of attempts to access the sales data point to a finite number before locking the user out of the system.

If, however, the authorization code received by the dispensing module matches the valid code, the dispensing module presents a sales data interface to the user [430]. The sales data interface may, for example, allow the user to input various criteria, which may constrain the sales data point. More specifically, the user may request via the sales data interface the sales data point of a particular product type or brand, or even multiple types or brands, within a defined time period. Further, the user may request the sales data point of product packages contained in one or more particular product bins in the system. The time period may, for instance, be a daily, weekly, monthly, or yearly time period, or even a daily fraction, such as a 12-hour work shift. The dispensing module thus receives the sales data request criteria from the user [432]. Based on the received sales data request, the dispensing module generates a report of sales data [434]. The report is then presented to the user through the graphical interface [436].

According to the method 400, the dispensing module may also receive an input of an additional quantity of product packages into the system [438]. For example, in some aspects, the dispensing module may provide an indication to the user when a predetermined minimum number of product packages of a particular type or brand remains in one or more product bins. Once such an indication is given, the user may supply the product bins with additional product packages (e.g., cigarette packages) and input in the additional quantity into the dispensing module via the POS terminal, remote terminal, or other appropriate device. The dispensing module then calculates a new product inventory based on the additional quantity of product packages and existing quantity of product packages in the product bins [440]. The dispensing module then presents the new product inventory to the user through the graphical interface [442].

Although FIG. 4 illustrates one method for dispensing consumer product packages, such as cigarette packages, other consumer product dispensing methods including a dispensing module may include fewer and/or a different arrangement of operations. For example, the dispensing module of method 400 may also keep track of a specific number of product packages remaining in each product bin as the product packages are dispensed from the system. Moreover, some operations in method 400 may be done in parallel to other operations.

A number of implementations have been described. Nevertheless, it will be understood that various modifications may be made. Accordingly, other implementations are within the scope of the following claims.

What is claimed is:

1. A system for dispensing consumer products, comprising:

a product dispensing apparatus that comprises a housing that at least partially encloses:

a product bin unit comprising:

a product bin adapted to hold at least one product package;

an ejector aperture; and a trigger aperture;

a product ejector coupled to the product bin unit through the ejector aperture and adapted to drive the product package from the product bin upon receipt of a dispensing signal, wherein the product ejector comprises an electrically actuated piston-cylinder comprising: an electromagnet adapted to drive at least a portion of the piston to extend from the cylinder through the ejector aperture to be in contact with the product package upon energizing, and a spring adapted to drive the portion of the piston into the cylinder upon de-energizing of the electromagnet;

a product trigger coupled to the product bin unit through the trigger aperture; and a controller in communication with the product ejector and the product trigger through one or more electrical connections, the controller comprising:

at least one memory, the memory storing a dispensing module and at least a portion of confidential data describing financial or proprietary information related to the consumer products; and one or more processors adapted to execute the dispensing module, the dispensing module operable when executed to:

present an authorization code request to a user that comprises a sales administrator or a sales associate of the product dispensing apparatus and is associated with management or sale of the consumer products enclosed in the product dispensing apparatus;

receive an authorization code from the user, the authorization code comprising a password operable to secure the confidential data, wherein the password comprises an administrator's password facilitating administer-level access to the portion of confidential data;

confirm the password as a valid code;

receive a dispensing instruction from the user;

transmit the dispensing signal to the product ejector based at least in part on the dispensing instruction and confirmation of the password as the valid code, such that the product ejector is electrically actuated to directly drive the product package from the product bin unit upon receipt of the dispensing signal;

receive, from the product trigger, a particular confirmation signal confirming that the product package has been driven from the product bin unit;

receive a request from the user for at least one sales data point associated with a value of sales of the product package in a specified time period, wherein the portion of confidential data describes financial or proprietary information related to the sales data point;

generate a report comprising the sales data point; and save the report for subsequent presentation to the user.

2. The system of claim 1, wherein the product bin unit further comprises:

a substantially vertical back plate comprising the ejector aperture;

a substantially horizontal bottom plate coupled to the back plate, the bottom plate comprising the trigger aperture;

a first vertical side plate and a second vertical side plate coupled to at least one of the back plate and the bottom plate; and a first substantially vertical divider plate coupled to at least one of the back plate and the bottom plate, the first divider plate arranged between the first and second side plates, at least a portion of the back plate, the bottom plate, the divider plate, and one of the first or second side plates defining the product bin.

3. The system of claim 1, wherein the product package comprises one of:

a tobacco product;

a medicinal product; or a shaving product.

4. The system of claim 1, wherein the product package comprises a tobacco product comprising one of a cigarette package or a smokeless tobacco package.

5. The system of claim 1, wherein the product package comprises a medicinal product comprising one of a pain reliever package or a cough syrup package.

6. The system of claim 1, wherein the product trigger comprises a sensor adapted to transmit a confirmation signal to the controller upon actuation of the piston-cylinder.

7. The system of claim 1, wherein the product bin unit comprises a first product bin unit, the system further comprising a second product bin unit and a cabinet adapted to enclose at least a portion of the first product bin unit, the second product bin unit, and the controller, the cabinet comprising:

a supply compartment comprising a door pivotally coupled to the cabinet; and a return compartment comprising a return opening.

8. The system of claim 7, wherein the first product bin unit comprises a first product bin open in a first direction and the second product bin unit comprises a second product bin open in a second direction that is approximately 180 degrees from the first direction, wherein product dispensed from the first product bin and product dispensed from the second product bin is received into the supply compartment and removable from the supply compartment through the door facing the first direction.

9. The system of claim 8, wherein the first product bin is adapted to hold a first size product package and the second product bin is adapted to hold a second size product package, the first size product package larger than the second size product package.

10. The system of claim 7, wherein the cabinet comprises a substantially opaque cabinet enclosing at least a portion of the first product bin unit, the second product bin unit, and the controller.

11. The system of claim 1, wherein the system further comprises an electronic data reader coupled to the controller and adapted to transmit the dispensing instruction to the controller at least partially based on data stored on a product purchase ticket.

12. The system of claim 11, wherein the electronic data reader comprises a magnetic ink character recognition (MICR) reader, the product purchase ticket comprising a MICR code, the MICR code comprising at least one of:

a representation of a product package quantity; and a representation of a product package type.

13. The system of claim 1, wherein the product bin is adapted to receive the product package from a front of the product bin.

14. The system of claim 1, wherein the dispensing module is further operable to:

present a graphical user interface (GUI) to a user;

receive the dispensing instruction from the user through the GUI, the dispensing instruction comprising a product type and a product quantity;

compare the product type to a product library stored in the memory;

compare the product quantity to a product inventory of the product type stored in the memory;

determine a product selection based on the product type and the product quantity;

generate the dispensing signal based on the product selection; and transmit the dispensing signal to the product ejector.

15. The system of claim 1, wherein the sales data point comprises one of:

a value of sales in the specified time period based on the product type;

a value of sales in the specified time period based on the product bin, the product bin comprising at least one product package of the same product type; and a value of sales in the specified time period based on a time shift period, the time shift period comprising at least a portion of a 24 hour period.

16. The system of claim 15, wherein the dispensing module is further operable to:

present a sales data request to the user; and receive the sales data request from the user, the request comprising the specified time period and one of:

the product type;

the product bin; or the time shift period.

17. The system of claim 14, wherein the dispensing module is further operable to:

receive an update to the product library stored in the memory;

receive a remote request from a remote user for the sales data point; and transmit the sales data point to the remote user.

18. The system of claim 14, wherein the dispensing module further operable to:

receive a second quantity of product packages of the product type input from the user;

calculate a new product inventory of the product type, the new product inventory equal to a sum of the product inventory and the second quantity; and present the new product inventory of the product type to the user.

19. A method for dispensing consumer product, comprising:

presenting an authorization code request to a user that comprises a sales administrator or a sales associate of a product dispensing apparatus and is associated with management or sale of consumer products enclosed in the product dispensing apparatus;

receiving an authorization code from the user, the authorization code comprising a password operable to secure at least a portion of confidential data describing financial or proprietary information related to the consumer products, wherein the password comprises an administrator's password facilitating administer-level access to the portion of confidential data, and the portion of confidential data describing financial or proprietary information related to at least one sales data point associated with a value of sales of a product package in a specific time period;

confirming the password as a valid code;

based at least in part on the confirmation of the password, presenting a graphical interface to the user;

receiving a product type and a product quantity from the user through the graphical interface;

comparing the product type to a product library stored in a memory;

comparing the product quantity to a product inventory of the product type stored in the memory;

determining a product selection based on the product type and the product quantity;

generating a dispensing signal based on the product selection;

transmitting the dispensing signal to a product ejector;

electrically actuating the product ejector to directly drive a first quantity of a product package from a product bin, the first quantity equal to the product quantity, wherein the product bin and the product ejector are enclosed in the product dispensing apparatus, and electrically actuating the product ejector comprises electrically actuating a piston-cylinder by an electromagnet to drive at least a portion of the piston to extend from the cylinder through an ejector aperture to be in contact with the product package upon energizing and by a spring to drive the portion of the piston into the cylinder upon de-energizing of the electromagnet;

receiving, from a product trigger enclosed in the product dispensing apparatus, a particular confirmation signal confirming that the first quantity of the product package has been driven from the product bin;

receiving a request from the user for the sales data point;

generating a report comprising the sales data point; and saving the report for subsequent presentation to the user.

20. The method of claim 19, wherein the sales data point comprises one of:

a value of sales in the specified time period based on the product type;

a value of sales in the specified time period based on a product bin, the product bin comprising at least one product package of the same product type; and a value of sales in the specified time period based on a time shift period, the time shift period comprising at least a portion of a 24 hour period.

21. The method of claim 20, wherein receiving a request from the user for the sales data point comprises:

based at least in part on the confirmation of the password, presenting a sales data request to the user; and receiving the sales data request from the user, the request comprising the specified time period and one of:

the product type;

the product bin; or the time shift period.

22. The method of claim 19, wherein the method further comprises:

receiving an update to the product library stored in the memory;

receiving a remote request from a remote user for the sales data point; and transmitting the sales data point to the remote user.

23. The method of claim 19, wherein the method further comprises:

receiving a second quantity of product packages of the product type;

calculating a new product inventory of the product type, the new product inventory approximately equal to a sum of the product inventory and the second quantity; and decreasing the new product inventory by the product quantity upon driving the first quantity of the product package from the product bin by the product ejector.

24. The method of claim 19, wherein receiving a product type and a product quantity from the user through a graphical user interface comprises receiving a product type and a product quantity from the user via a MICR code on a product purchase ticket.

25. The method of claim 19, wherein the product bin comprises a first product bin, the method further comprising:

dispensing the first quantity of the product package from the first product bin open in a first direction into a supply compartment;

dispensing a second quantity of the product package from a second product bin open in a second direction into the supply compartment, the second direction approximately 180 degrees opposed to the first direction, wherein the supply compartment comprises a door open in the first direction configured to allow removal of the first and second quantities of the product package.

26. The method of claim 19, wherein receiving a particular confirmation signal comprises receiving the particular confirmation signal transmitted from a sensor in the product trigger upon electrically actuating the piston-cylinder.

* * * * *